United States Patent [19]

Utsunomiya

[11] Patent Number: 5,034,596

[45] Date of Patent: Jul. 23, 1991

[54] IC CARD PROCESSING APPARATUS

[75] Inventor: Yukio Utsunomiya, Tokyo, Japan

[73] Assignee: Kabushiki Kaisha Toshiba, Kawasaki, Japan

[21] Appl. No.: 342,801

[22] Filed: Apr. 25, 1989

[30] Foreign Application Priority Data

Apr. 30, 1988 [JP] Japan ................................ 63-108481

[51] Int. Cl.$^5$ .............................................. G06K 7/10
[52] U.S. Cl. .................................... 235/380; 235/379; 235/436
[58] Field of Search ................ 235/375, 380, 436, 487, 235/492, 379

[56] References Cited

U.S. PATENT DOCUMENTS

| | | | |
|---|---|---|---|
| 4,650,975 | 3/1987 | Kitchener | 235/375 |
| 4,672,182 | 6/1987 | Hirokawa | 235/375 X |
| 4,767,920 | 8/1988 | Kitta et al. | 235/492 |
| 4,855,578 | 8/1989 | Hirokawa et al. | 235/380 |
| 4,864,109 | 9/1989 | Minematsu et al. | 235/379 |
| 4,868,900 | 9/1989 | McGuire | 235/380 |

Primary Examiner—Stuart S. Levy
Assistant Examiner—Steven M. duBois
Attorney, Agent, or Firm—Cushman, Darby & Cushman

[57] ABSTRACT

An IC card processing apparatus has a data reading/writing unit which accepts an IC card and electrically connects the IC card with terminal equipment. Data is exchanged with the IC card and/or the data reading/writing unit. To shorten the time for processing data of the IC card processing apparatus, the terminal equipment directly exchanges data with the IC card. To achieve this, the data line of the terminal equipment is connected to the data line of the IC card. Before using the IC card for transactions, the data reading/writing unit feeds a personal identification number (PIN) to the IC card for identifying the PIN information. To prevent the PIN information from being delivered to the terminal equipment, a switch is provided between the data line of the terminal equipment and the data line of the IC card. While identification of the PIN information is underway, the switch remains totally open, preventing reception of the code by an unauthorized party.

6 Claims, 3 Drawing Sheets

IC CARD PROCESSING APPARATUS

BACKGROUND OF THE INVENTION

The present invention relates to an IC card processing apparatus which includes a data reading/writing unit for exchanging data with an IC card and terminal equipment for exchanging data with a data reading/writing unit.

A conventional IC card processing apparatus processes data by allowing the terminal equipment to transmit data to the data reading/writing unit before allowing the data 10 reading/writing unit to eventually identify the contents of the IC card. If the data reading/writing unit receives command data to control an operation of the data reading/writing unit itself, it executes operations corresponding to the content of the command data, and then transmits the result of the process to the terminal equipment as response data. On the other hand, if the data reading/writing unit receives data other than a control or command signal from the terminal equipment, the data reading/writing unit transmits the received data to the IC card. The IC card executes processes corresponding to the content of the command data and transmits the processed result to the data reading/writing unit as the response data. The data reading/writing unit transmits received response data to the terminal equipment. A typical example of an IC card processing apparatus incorporating the above structure is disclosed in U.S. Pat. No. 4,672,182 to Hirokawa.

When operating such an IC card processing apparatus, the data reading/writing unit relays data between the terminal equipment and the IC card. To achieve this objective, it is essential for the system to execute communication between the terminal equipment and the data reading/writing unit and also between the data reading/writing unit and the IC card. This requires the system to spend a significant amount of time executing the entire data processing operation.

Recently, another system for processing IC cards has been under development by the assignee of this invention. This system would allow the terminal apparatus to directly exchange the data with the IC card. To achieve this, data lines of both the terminal equipment and the data reading/writing unit are directly connected to the data line of the IC card.

All of these systems, however, and specifically the latter, have another problem. Specifically, a personal identification number (PIN) is delivered to the IC card via the keyboard of the data reading/writing unit without being delivered to the terminal equipment. The security of the system is maintained based the PIN information never being delivered to the terminal equipment. However, the PIN information may potentially flow into the terminal equipment because data lines of the terminal equipment and the IC card are directly connected to each other. This reduces the security of the system.

SUMMARY OF THE INVENTION

It is an object of the present invention to provide a novel IC card processing apparatus which preserves the security of PIN information. An IC card processing apparatus according to this invention comprises insert means for receiving the IC card and electrically connecting with the IC card, read/write means for transmitting data to the IC card in the insert means, including means for supplying PIN data corresponding to the holder, input means electrically connected to the read/write means and the IC card for inputting transaction data to the IC card corresponding to specific transactions to be processed, and switch means for interrupting the electrical connection between the input means and the IC card during transmission of the PIN data from the read/write means to the IC card.

BRIEF DESCRIPTION OF THE DRAWINGS

The embodiments of this invention will now be described by way of examples and with reference to the accompanying drawings, in which.

DETAILED DESCRIPTION OF THE PREFERRED EMBODIMENT

Figures 1, 2:
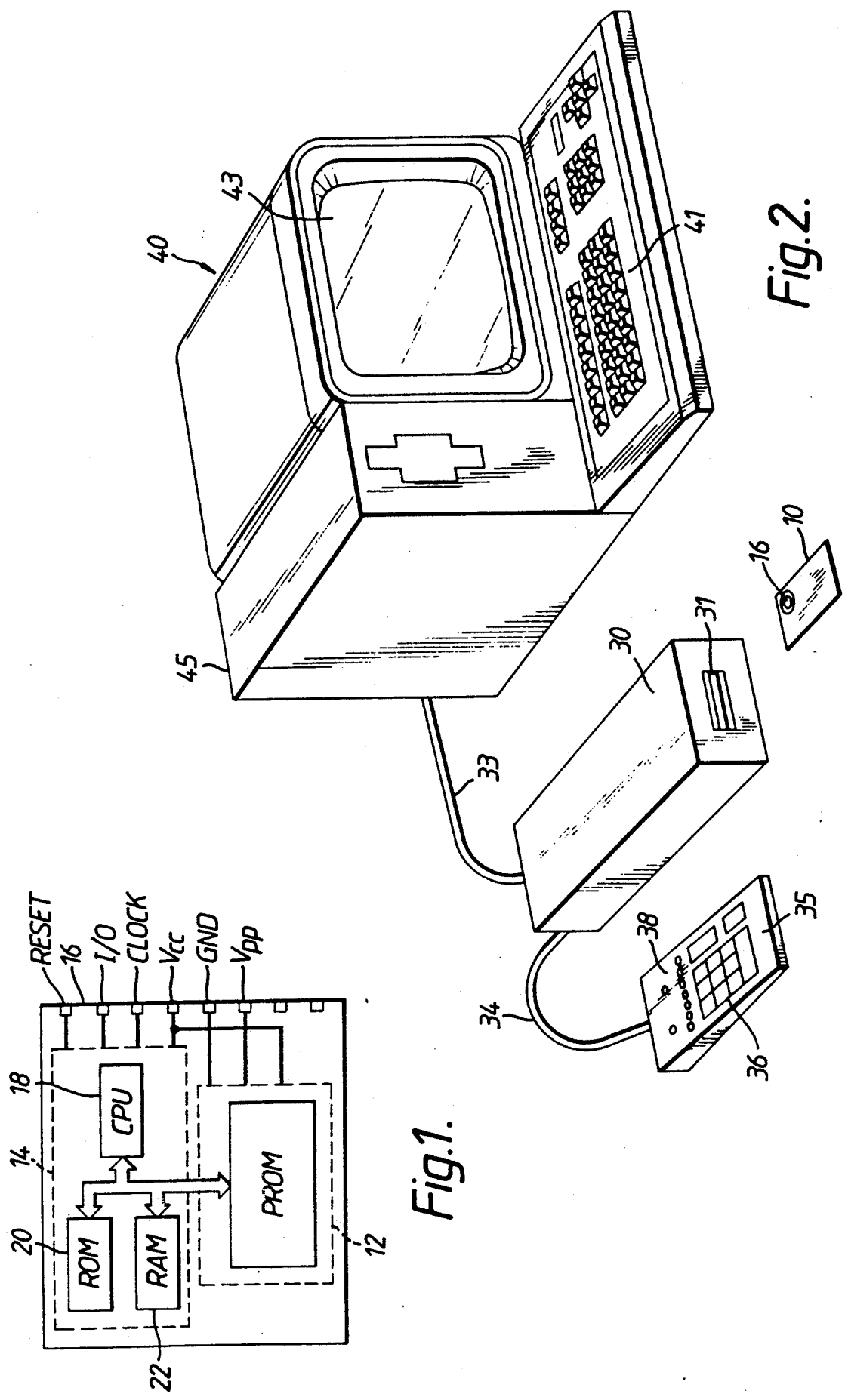
FIG. 1 is a simplified block diagram of the electrical circuit within the IC card.
FIG. 2 is an overall perspective view of the data reading/writing unit and the terminal equipment.

Referring now to FIG. 1, the IC card 10 has a credit card type packaging, for example. The IC card 10 comprises a PROM 12, which is a data memory for storing transaction data, a controller 14, which writes data into and reads data from the PROM 12, and a contact 16 which in operation is electrically connected to a data reading/writing unit 30. The controller 14 has a CPU in, which executes the overall control of a data processing operation in accordance with stored programs, a ROM 20, which stores programs for operating the CPU 18, and a RAM 22, which temporarily stores the data while the CPU 18 executes control operations.

The IC card 10 incorporating the above elements is inserted into the data reading/writing unit 30 via an inlet 31 shown in FIG. 2. The data reading/writing unit 30 is electrically connected to terminal equipment 40 by a cable 33. The terminal equipment 40 is composed of a personal computer, for example, which includes a data-input keyboard 41, CRT display 43 for displaying data, and a floppy-disc device 45 for storing data. The terminal equipment 40 outputs the operation command signal to the data reading/writing unit 30 and exchanges data with the IC card 10. An operating panel 35 is electrically connected to the data reading/writing unit 30 via cable 34. The operating panel 35 is composed of the PIN information input keyboard 36 and a display 38, which displays the key-input figure number.

Figure 3:
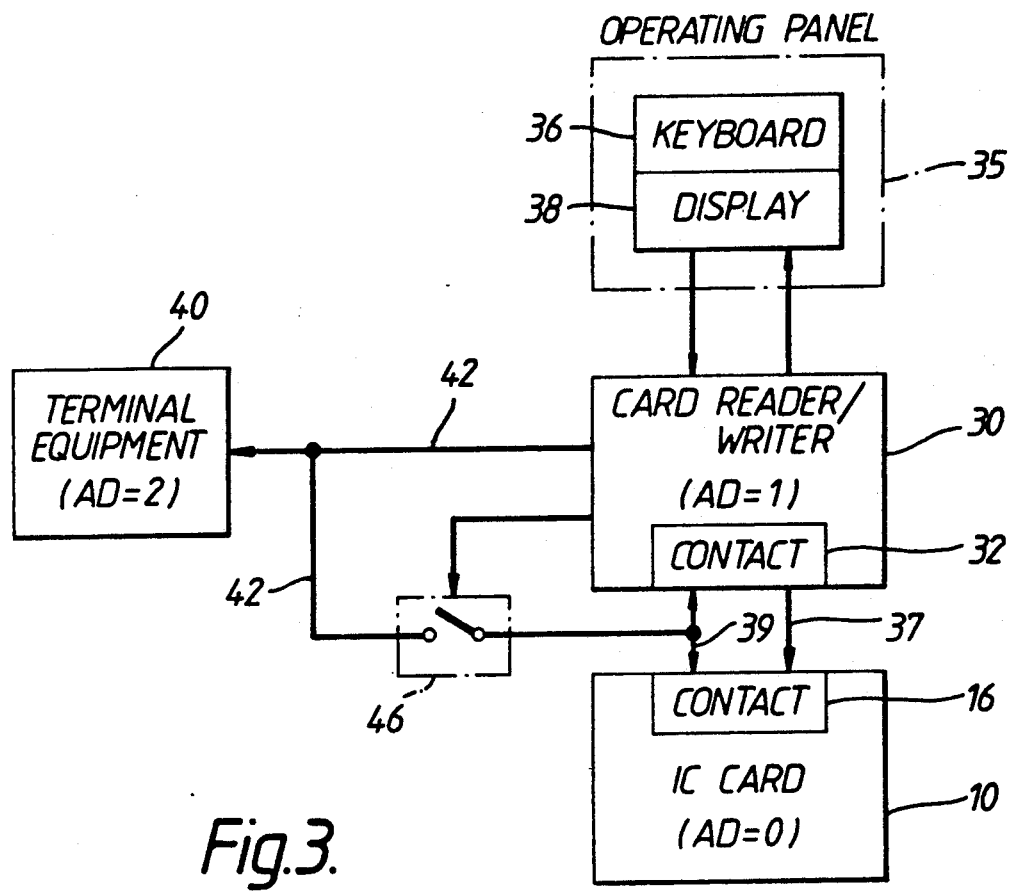
FIG. 3 is a simplified block diagram designating the connection between the terminal equipment, the data reading/writing unit, and the IC card.

The electrical connection of the above components is now described with reference to FIG. 3. The data reading/writing unit 30 has a contact 32, which is electrically connected to the contact 16 of the IC card 10. The contact 32 corresponds to the contact 16 of the IC card shown in FIG. 1, where each of these contacts 16 and 32 is provided with a data input/output terminal (I/0) a control signal terminal having a reset terminal (RESET), and a clock signal supply terminal (CLOCK). The data reading/writing unit 30 feeds the power, clock signal, and reset signal to the IC card 10 via control line 37 shown between contacts 16 and 32. The data reading/writing unit 30 also exchanges data with the IC card 10 via data line 39. A switch 46 is provided in a data line 42, which connects the data reading/writing unit 30 to the terminal equipment 40. The switch 46 is turned ON and OFF by the control signal delivered from the data reading/writing unit 30.

Figure 4:
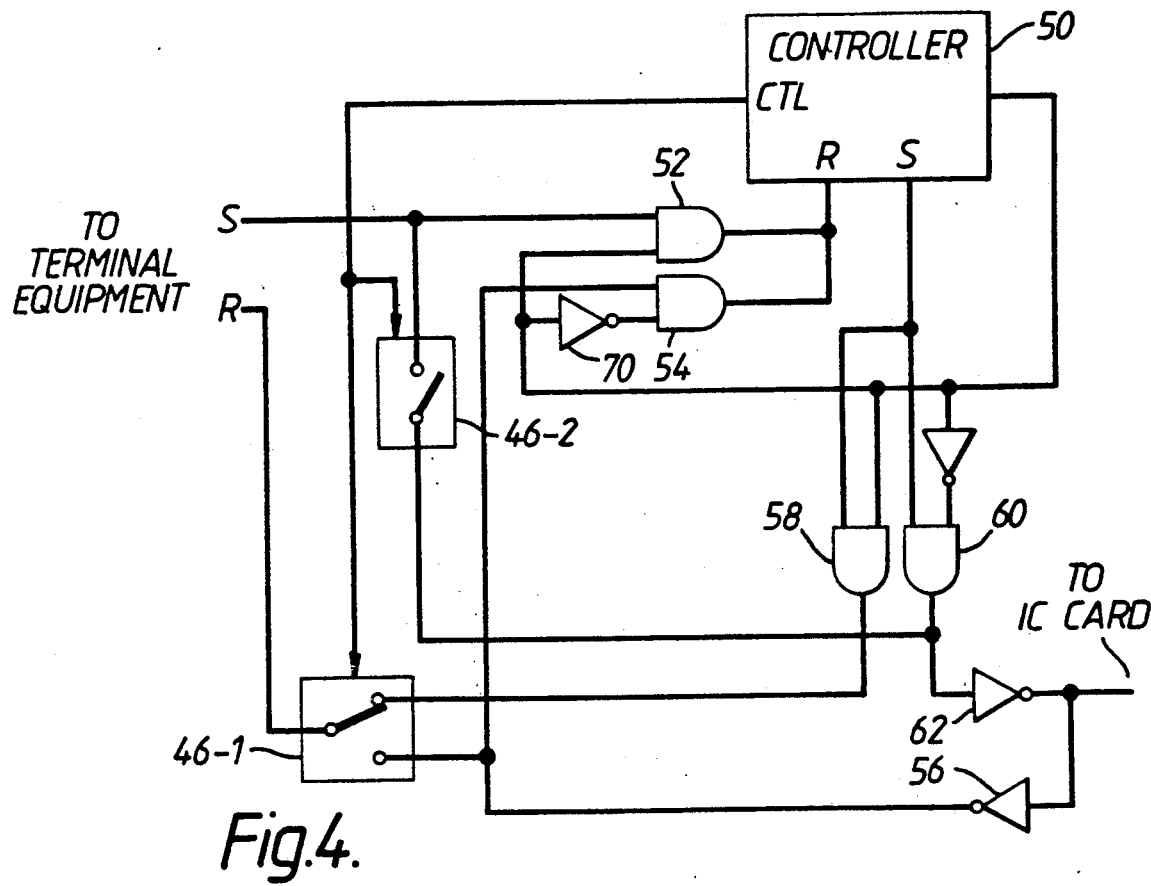
FIG. 4 is an electric circuit designating the connection of essential components shown in FIG. 3.

FIG. 4 will be used to help explain details of the switch 46 and data line 42. The data reading/writing unit 30 comprises a controller 50 which has a data-receiving line R and a data-supply line S. A data-supply line S of the terminal equipment 40 is connected to the data receiving line R of controller 50 via AND gate 52. A data line of the IC card 10 is connected to the data-receiving line R via AND gate 52 and inverter 54. AND gates 54 and 56 control which of terminal equipment 40 or IC card 10 will be connected to the R input of controller 50. Inverter 70 ensures that only one of AND gates 52 and 54 will be ON at any given time.

The data-supply line S of controller 50 is connected to a first contact of a first switch 46-1 via AND gate 58. The second contact of the first switch 46-1 is connected to the output terminal of inverter 56, which is the data line of IC card 10. The common contact of the first switch 46-1 is connected to the data-receiving line R of the terminal equipment 40. Switch 46-1 therefore controls which of S output of controller 50 or the output of IC card 10 will be connected to R input of terminal equipment 40.

The data-supply line S of controller 50 is also connected to the data line of the IC card 10 via AND gate 60 and inverter 62. The output terminal of AND gate 60 is connected to the data-supply line of the terminal equipment 40 via a second switch 46-2. Since the outputs of terminal equipment 40 and AND gate 60 are wire-ored, it is necessary that at least one have a shortable output (e.g., open collector).

First and second switches 46-1 and 46-2 are turned ON and OFF by the control signal from the controller 50. AND gates 52, 54, 58 and 60 are also controlled by the controller 50. These AND gates selectively connect the data-receiving line R and the data-supply line S of controller 50 to the terminal equipment 40 and the IC card 10.

Figure 5:
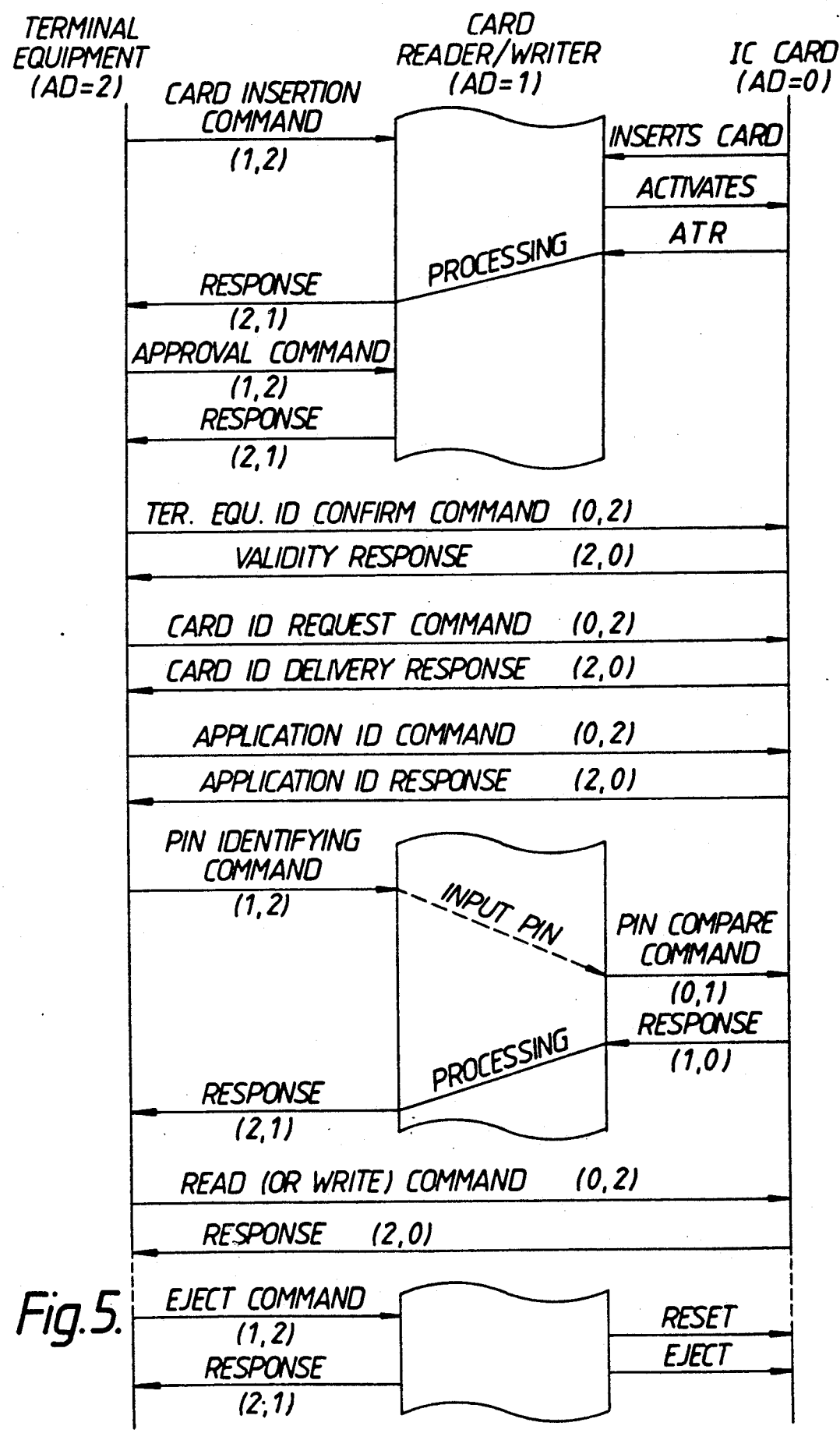
FIG. 5 is a flowchart designating sequential data-exchange processes shown in FIG. 3.

Referring now to FIG. 5, a data flow for the exchange operation of the IC card processing apparatus of the invention is described. Each component of the data processing apparatus is provided with a specific address number. For example, IC card 10 is provided with address number "0". The data reading/writing unit 30 has the address number "1" and the terminal equipment 40 has the address number "2", respectively. In FIG. 5, addresses for the transmitted and received data are grouped together using the format ("receiver address" "transmitter address"). For example, (1,2) designates the data from the terminal equipment 40 (AD2) to the data reading/writing unit 30 (AD1). Numeric code (2,0) designates the data from the IC card (AD0) to the terminal equipment 40 (AD2).

Initially, switch 46 remains OFF. In particular, first switch 46-1 is connected to the data reading/writing unit 30 and second switch 46-2 remains OFF (open).

First, the terminal equipment 40 outputs the card insertion command data (1,2) via data line 42, instructing the insertion of the IC card to the data reading/writing unit 30. The data reading/writing unit 30 displays a message on the display 38 confirming the insertion of the IC card 10 into the unit itself. When the IC card 10 is fully inserted in the data reading/writing unit 30, the data reading/writing unit 30 feeds the power and reset signal to the IC card 10 for activating the operation of this card. The activated IC card 10 then outputs the initial response data signal "Answer to Reset (ATR)" to the data reading/writing unit 30.

On receipt of this initial response data signal, the data reading/writing unit 30 processes this signal into the response data. The processed data signal is then output to the terminal equipment 40 as the response data (2,1) to the command data output from the terminal equipment 40.

On receipt of the response data, the terminal equipment 40 checks the response data. If the terminal equipment 40 identifies from the check result that the inserted IC card is still valid for use, then the terminal equipment 40 outputs an approval command data (1,2) to the data reading/writing unit 30 to approve the use of this IC card 10. On receipt of this command data (1,2), the data reading/writing unit 30 turns switch 46 ON. In particular, the data reading/writing 30 connects first switch 46-1 to the IC card 10 and turns second switch 46-1 ON.

Then, in response to the command data the data reading/writing unit 30 outputs the response data (2,1) to the terminal equipment 40, which approves the use of the IC card 10. On receipt of the response data (2,1) from the data reading/writing unit 30, the terminal equipment 40 identifies that the switch 46 is ON, and then directly exchanges data with the IC card 10. Specifically, the terminal equipment 40 directly outputs that command data to the IC card. This data includes first command data (0,2), which confirms identification (ID) of the terminal equipment 40 in the IC card 10, second command data (1,2) which requests the IC card 10 to identify itself, and third command data (0,2), which requests the IC card to identify the kind of functional operation performed by the terminal equipment 40. In response to the first, second and third command data, the IC card !0 transmits response data (2,0) to the terminal equipment on receipt of each command data from the terminal equipment 40.

The controller 50 of the data reading/writing unit 30 receives the command data (0,2) from the terminal equipment 40 and the response data (2,0) from the IC card 10. However, the controller remains totally inoperative because it identifies that those unit-addresses present in the command data and the response data are ineffective for use with the data reading/writing unit 30.

Next, the terminal equipment 40 outputs a command data (1,2) designating PIN verification to the data reading/writing unit 30. After identifying that the received signal is substantially the PIN-verification command data (1,2), the data reading/writing unit 30 turns the switch 46 OFF. Specifically, the data reading/writing unit 30 connects first switch 46-1 to the data reading/writing unit 30 and turns second switch 46-2 OFF.

The data reading/writing unit 30 activates the display 38 to display a message designating the entry of the PIN information from the keyboard 36. When the PIN information is input via the keyboard 36, the data reading/writing unit 30 outputs the command data (0,1) to the I C card 10. The command data (0,1) includes a PIN compare instruction, combined with the entered PIN information. While this operation is underway, AND gate 60 remains ON and AND gate 58 remains OFF. As a result, this command data (0,1) is not delivered to the terminal equipment 40, but it is merely delivered to the IC card 10.

On receipt of the command data (0,1) designating the PIN verification, the IC card 10 executes operations for verifying the PIN information. Particularly, the IC card first compares the PIN information added to the command data and the PIN information which is internally stored in the IC card 10 itself, and then identifies whether these PIN information coincide. Then, the IC card 10 transmits the identified result to the data reading/writing unit 30 as the response data (1,0). The data reading/writing unit 30 processes the received response data (1,0) into the response data (2,1), for the terminal equipment 40. The, the data reading/writing unit 30 turns switch 46 ON, and transmits the response data (2,1) to the terminal equipment 40.

The switch 46 remains totally OFF while the PIN information is being checked by the data reading/writing unit 30 and the IC card 10. As a result, this securely prevents the identified data such as the PIN information from being delivered to the terminal equipment 40 through data line 42.

After completing identification of the PIN information, as per the command data from the terminal equipment 40, the data reading/writing unit 30 directly writes and reads transaction data into and from the IC card 10.

After completing the reading and writing of data, the terminal equipment 40 outputs the command data (1,2) to the data reading/writing unit 30 instructing it to eject the IC card 10. On receipt of this command data (1,2), the data reading/writing unit 30 outputs a reset signal to the IC card 10 to reset the operations of the IC card 10. After stopping the supply of the power and the clock signal to the IC card, the data reading/writing unit 30 ejects the IC card 10. When the ejection of the IC card 10 is completed, the data reading/writing unit 30 outputs the response data (2,1) to the terminal equipment 40 to answer back to the card-eject command data. This completes the entire data processing operation.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An IC card processing apparatus for selective connection and data communication with an IC card, comprising:

insert means for receiving the IC card and electrically connecting with the IC card;

read/write means, coupled to said insert means, for transmitting data for the IC card to the insert means, including PIN supplying means for supplying PIN data corresponding to a predetermined security code;

input means, coupled to the read/write means, for inputting transaction data for the IC card to the insert means, corresponding to specific transactions to be processed; and switch means, electrically coupled to and interposed between the input means and the insert means, for interrupting an electrical connection between the input means and the insert means during transmission of the PIN data from the read/write means to the insert means.

2. The IC card processing apparatus according to claim 1, wherein the PIN supplying means includes means for allowing manual entry of the PIN data, and means for transferring the PIN data entered into the entering means to the insert means to be communicated with the IC card.

3. The IC card processing apparatus according to claim 2, wherein the input means includes a data signal line connected to the insert means and the switch means includes a first switch for automatically interrupting the data signal line when the read/write means supplies the PIN data to the IC card.

4. An IC card processing apparatus for selective connection with an IC card, comprising:

means for transmitting and receiving data to and from the IC card;

means for instructing an operation of the IC card and the transmitting/receiving means, the instructing means being electrically connected to the IC card by a data signal line; and means for disconnecting the data signal line during transmission of specific data related to the holder of the IC card from the transmitting/receiving means to the IC card.

5. The IC card processing apparatus according to claim 4, wherein the transmitting/receiving means includes means for entering a personal identification number (PIN) and means for supplying the PIN from the entering means to the IC card.

6. The IC card processing apparatus according to claim 5, wherein the disconnecting means includes means for switching the data signal line when the supplying means supplies the PIN information to the IC card.

* * * * *